(12) United States Patent
Lin et al.

(10) Patent No.: US 9,417,443 B2
(45) Date of Patent: Aug. 16, 2016

(54) PROJECTOR, PROJECTING LENS OF THE PROJECTOR AND METHOD OF PROJECTING IMAGES

(71) Applicants:Yi-Jou Lin, Taichung (TW); Hsin-Ying Wu, Taichung (TW)

(72) Inventors: Yi-Jou Lin, Taichung (TW); Hsin-Ying Wu, Taichung (TW)

(*) Notice: Subject to any disclaimer, the term of this patent is extended or adjusted under 35 U.S.C. 154(b) by 309 days.

(21) Appl. No.: 14/287,839

(22) Filed: May 27, 2014

(65) Prior Publication Data

US 2015/0346469 A1 Dec. 3, 2015

(51) Int. Cl.
*G03B 21/28* (2006.01)
*G02B 17/08* (2006.01)
*G02B 13/16* (2006.01)

(52) U.S. Cl.
CPC ............... *G02B 17/08* (2013.01); *G02B 13/16* (2013.01); *G03B 21/28* (2013.01)

(58) Field of Classification Search
CPC ........ G02B 17/08; G02B 13/16; G02B 17/00; G03B 21/28
See application file for complete search history.

(56) References Cited

U.S. PATENT DOCUMENTS

2010/0208364 A1* 8/2010 Minefuji ............ G02B 17/0816
359/731

* cited by examiner

*Primary Examiner* — Sultan Chowdhury
*Assistant Examiner* — Danell L Owens
(74) *Attorney, Agent, or Firm* — Ming Chow; Sinorica, LLC

(57) ABSTRACT

A projector includes an image ray generator and a projecting lens, wherein the image ray generator generates image rays. The projecting lens includes a relay optical system for receiving the image rays and a projection optical system having at least one lens and a reflector. Whereby, the image rays pass through the relay optical system, pass through the at least one lens, and then are reflected by the reflector. After being reflected, the image rays pass through the at least one lens again, and then leave the projecting lens to be projected onto a screen. In addition, the invention further discloses the structure of the projecting lens and a method of projecting images.

16 Claims, 4 Drawing Sheets

PROJECTOR, PROJECTING LENS OF THE PROJECTOR AND METHOD OF PROJECTING IMAGES

BACKGROUND OF THE INVENTION

1. Field of the Invention

The present invention relates generally to a projection device, and more particularly to a projector, a projecting lens of the projector, and a method of projecting images.

2. Description of the Related Art

With advancement in technology, projectors have become the most popular devices used in a presentation. A projecting lens in a projector is the most important element to clearly show images on a screen.

In order to use the projector in a limited space, short-throw projection is a common requirement in the modern projector. A conventional projecting lens for short-throw projection usually has a lot of large lenses to obtain short-throw projection and high optical performance.

Therefore, the size and weight of the conventional projecting lens for short-throw projection conflicts with the current design focus of projectors, which is miniaturization and lightweight. Besides, it takes a high cost to manufacture the conventional projecting lenses because of their sizes.

In conclusion, the conventional projecting lens of the short-throw projector needs to be improved.

SUMMARY OF THE INVENTION

The primary objective of the present invention is to provide a projecting lens of a projector, which has a small size, low cost, and high optical performance.

According to the objective of the present invention, the present invention provides a projector, which includes an image ray generator and a projecting lens. The image ray generator generates image rays; the projecting lens receives the image rays from the image ray generator and projects the image rays onto a screen, wherein the projecting lens includes a projection optical system and a relay optical system which is closer to the image ray generator than the projection optical system. The relay optical system has a plurality of lenses, through which the image rays from the image ray generator pass to the projection optical system. The projection optical system includes a lens group and a reflector, and the lens group is between the relay optical system and the reflector; the lens group includes at least one lens, and has a first optical side facing the relay optical system and a second optical side facing the reflector. The image rays enter the lens group through the first optical side and leave through the second optical side, and then the image rays is reflected by the reflector to enter the lens group again through the second optical side; the image rays are projected onto the screen after leaving the lens group through the first optical side.

The present invention further provides a projecting lens, which includes a relay optical system and a projection optical system. The relay optical system includes a plurality of lenses; the projection optical system includes a lens group and a reflector, wherein the lens group is between the relay optical system and the reflector; the lens group includes at least a lens, and has a first optical side facing the relay optical system and a second optical side facing the reflector; wherein image rays pass through the relay optical system, enter the lens group through the first optical side, and then leave through the second optical side to be reflected by the reflector to enter the lens group again through the second optical side and then leave through the first optical side.

The present invention further provides a method of projecting an image onto a screen, which includes the steps of: generating image rays which contain an image; making the image rays pass through a relay optical system, wherein the relay optical system has a plurality of lenses; making the image rays pass through a lens group, wherein the image rays enter the lens group through a first optical side thereof and leave through a second optical side thereof; reflecting the image rays back into the lens group again, wherein the reflected image rays enter the lens group through the second optical side and leave through the first optical side; and projecting the image rays onto a screen after the image rays leaving the leas group.

Therefore, the projecting lens of the projector and the method of projecting images can reduce the size of the projector, and lower the cost of manufacturing. In addition, the projector would have high optical performance.

DETAILED DESCRIPTION OF THE INVENTION

Figure 1:
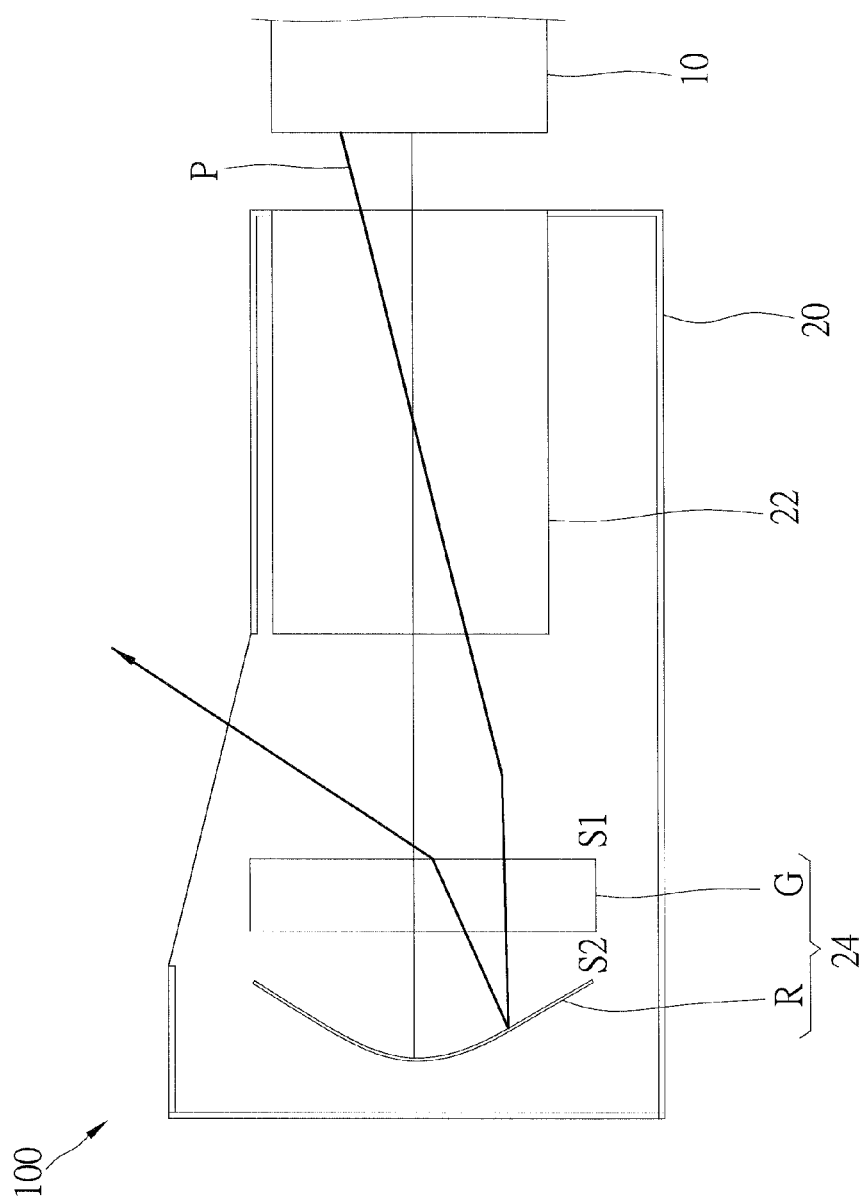
FIG. 1 is a sketch diagram of the projector of a first preferred embodiment of the present invention.

As shown in FIG. 1, a projector 100 of the first preferred embodiment of the present invention includes an image ray generator 10 and a projecting lens 20. The image ray generator 10 generates image rays P which contain an image. The image ray generator 10 has a prism F where the image rays P emit through. The image rays P emit through the projecting lens 20 to be projected onto a screen. The projecting lens 20 includes a relay optical system 22 and a projection optical system 24 in an order from an image source side, which is closer to the image ray generator 10, to an image formation side, which is closer to the screen.

Figure 2:
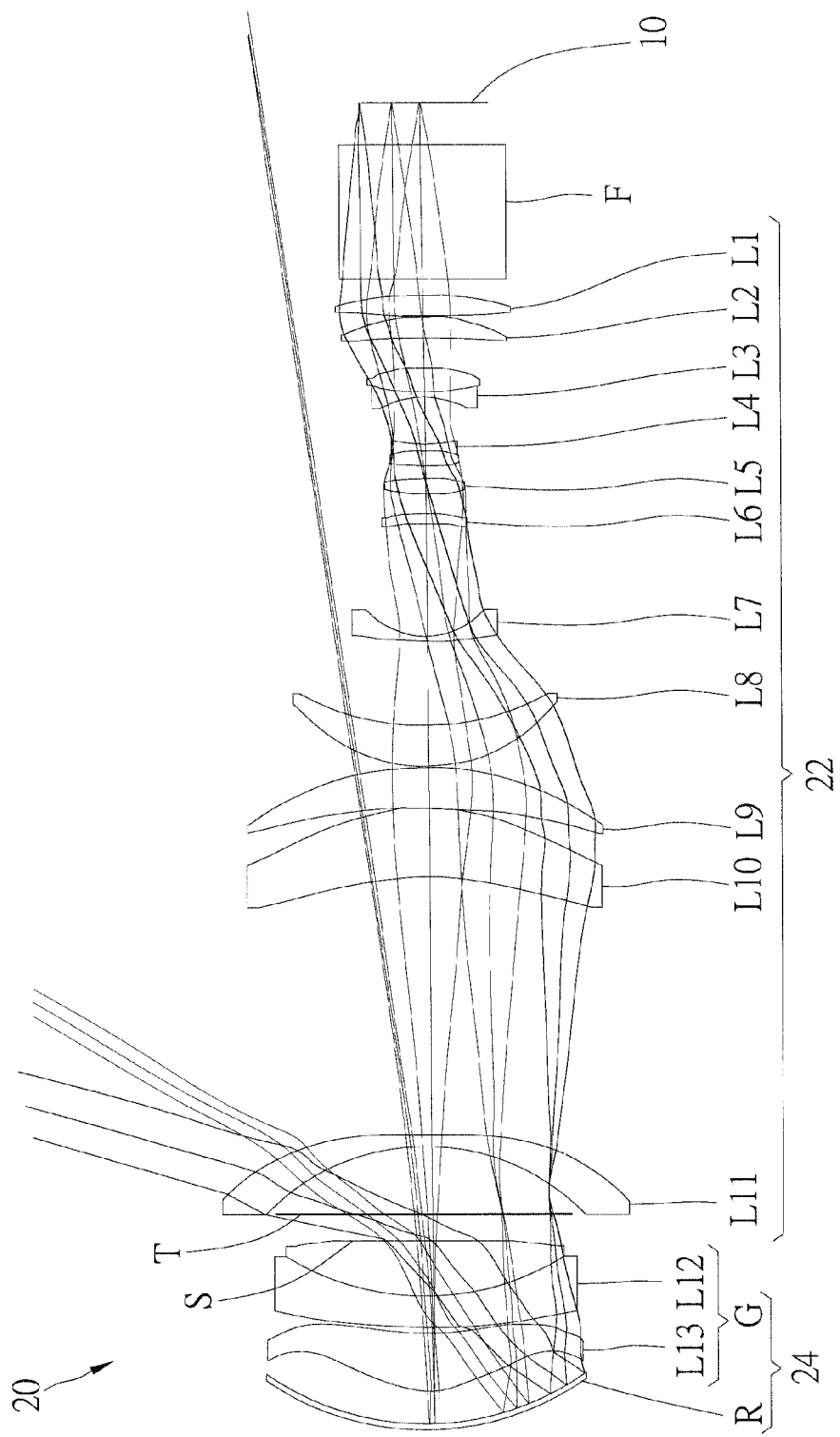
FIG. 2 is a sketch diagram of the arrangement of the lenses of the projecting lens of the first preferred embodiment of the present invention.

As shown in FIG. 2, the relay optical system 22 includes eleven lenses L1-L11 in sequence, in which the first lens L1 is closest to the image source side, and the eleventh lenses L11 is closest to the image source side. The first, second, fifth, sixth, seventh, eighth, ninth, tenth, and eleventh lenses L1-L2 and L5-L11 are single lenses, and the third and fourth lenses L3 and L4 are bonded together to form a compound lens. The relay optical system 22 receives the image rays P from the image ray generator 10, changes the optical characteristics of the image rays P, and then emits it to the projection optical system 24. The number of the lenses in the relay optical system 22 and the formation of each lens may differ according to different optical requirements.

As shown in FIG. 1 and FIG. 2, the projection optical system 24 includes a lens group G and a reflector R. The lens group G is closer to the relay optical system 22 than the reflector R. In other words, the lens group G is between the relay optical system 22 and the reflector R. The lens group G includes two lenses L11 and L12, in which the lens L11 is a single lens, and the lens 12 is a compound lens. The lens group G has a first optical side S1, which is closer to the relay optical system 22, and a second optical side S2, which is closer to the reflector R. The first optical side S1 is a surface of the lens L12 facing the relay optical system 22, and the second optical side S2 is a surface of the lens L13 facing the reflector R. The reflector R has an aspheric concave surface facing the lens group G. A diameter of reflector R is in a range between 0.5 times and 1.5 times of a diameter of the largest lens of the relay optical system 22 and the projection optical system 24. In practice, the surface of the reflector R could be a spherical surface or any other surfaces as well. In the first preferred embodiment, the diameter of the reflector R is 62 mm, and the largest lens of the projection optical system 24 is the lens L11 with a diameter of 80 mm, which means, the diameter of the reflector R is 0.775 times of the diameter of the largest lens of the relay optical system 22 and the projection optical system 24.

The projecting lens 20 further satisfies the following condition:

$$-20 \leq CRA \leq 20$$

where CRA is a chief ray angle of the projection optical system 24.

In the first preferred embodiment, the chief ray angle is 7.542 when a normalized field at a testing position T (the edge of projection, as shown in FIG. 2) is 1.0.

Figure 3:
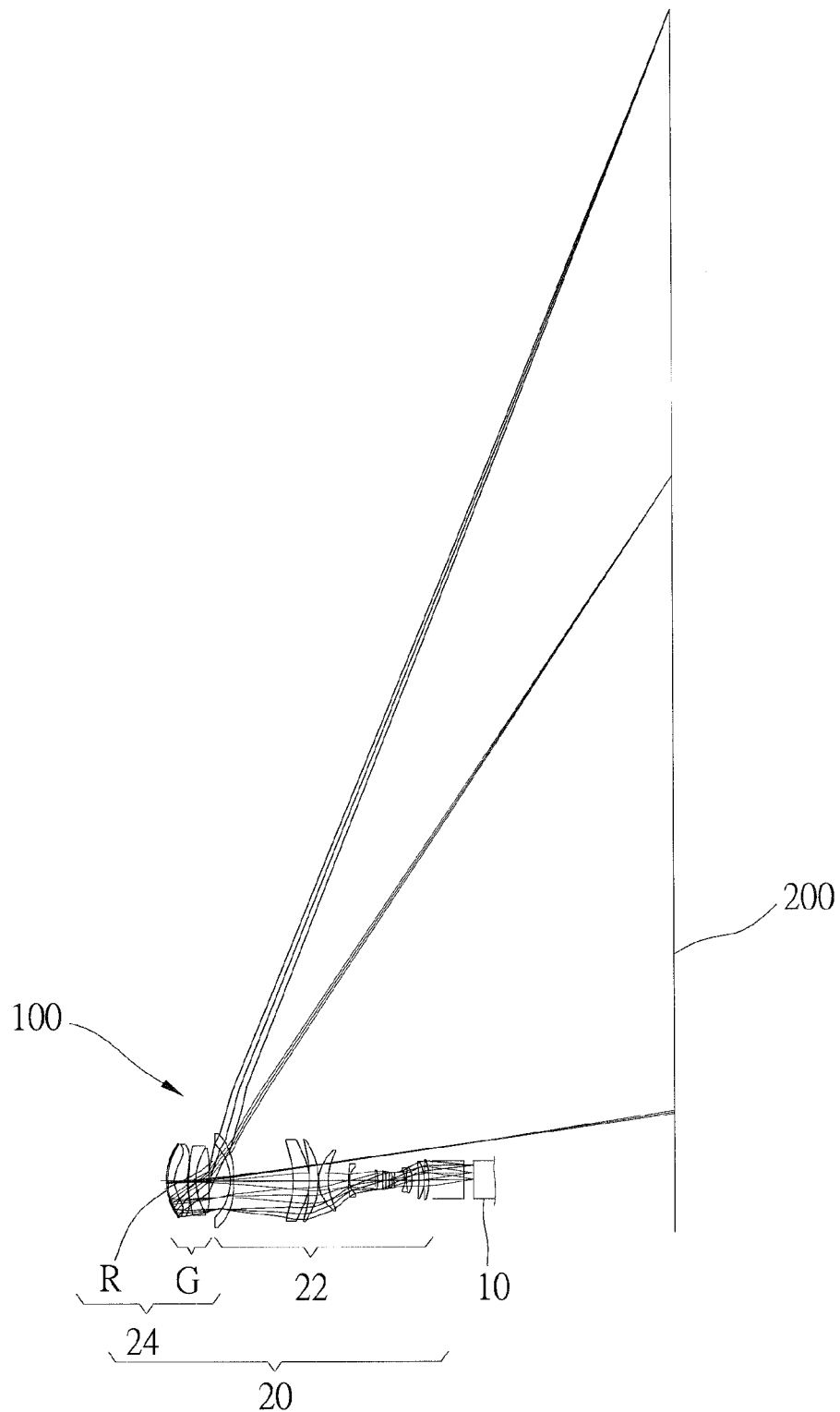
FIG. 3 is a sketch diagram of the first preferred embodiment of the present invention, showing the light paths between the projecting lens and the screen.

As shown in FIG. 3, after the image rays P from the image ray generator 10 enter the projecting lens 20, they pass through the relay optical system 22, enter the lens group G through the first optical side S1, and then leave the lens group G through the second optical side S2 to the reflector R. The reflector R reflects the image rays P back to the lens group G. Next, the reflected image rays P enter the lens group G through the second optical side S2, and leave through the first optical side S1. The image rays P continuously pass through the eleventh lens L11, which is the lens of the relay optical system 22 closest to the projection optical system 24, and the eleventh lens L11 projects the image rays P onto a screen 200. Some of the image rays P continuously pass through the lenses L10, L9, and L8, and then are projected onto the screen 200. More specifically, the image rays P pass through the lens group G twice with the reflection of the reflector R to obtain short-throw projection and high optical performance with lesser and smaller lenses.

The number of lenses L1-L11 in the relay optical system 22 is larger than the number of lenses L12, L13, and the reflector R in the projection optical system 24. The purpose of such design is to provide high optical performance with the relay optical system 22, and therefore the projector 100 is able to project a clear image onto the screen in a short distance.

In addition, an area of a portion on the first optical side S1 of the lens group G where the image rays P pass through is smaller or equal to a half of an area of the entire first optical side S1. The image rays P from the image ray generator 10 (before being reflected by the reflector R) and the image rays P from the projection optical system 24 (after being reflected by the reflector R) do not cross in the lens L11, which is the last lens for the image rays P passing through before leaving the projecting lens 20. It may avoid optical interference to ensure higher image quality.

Figure 4:
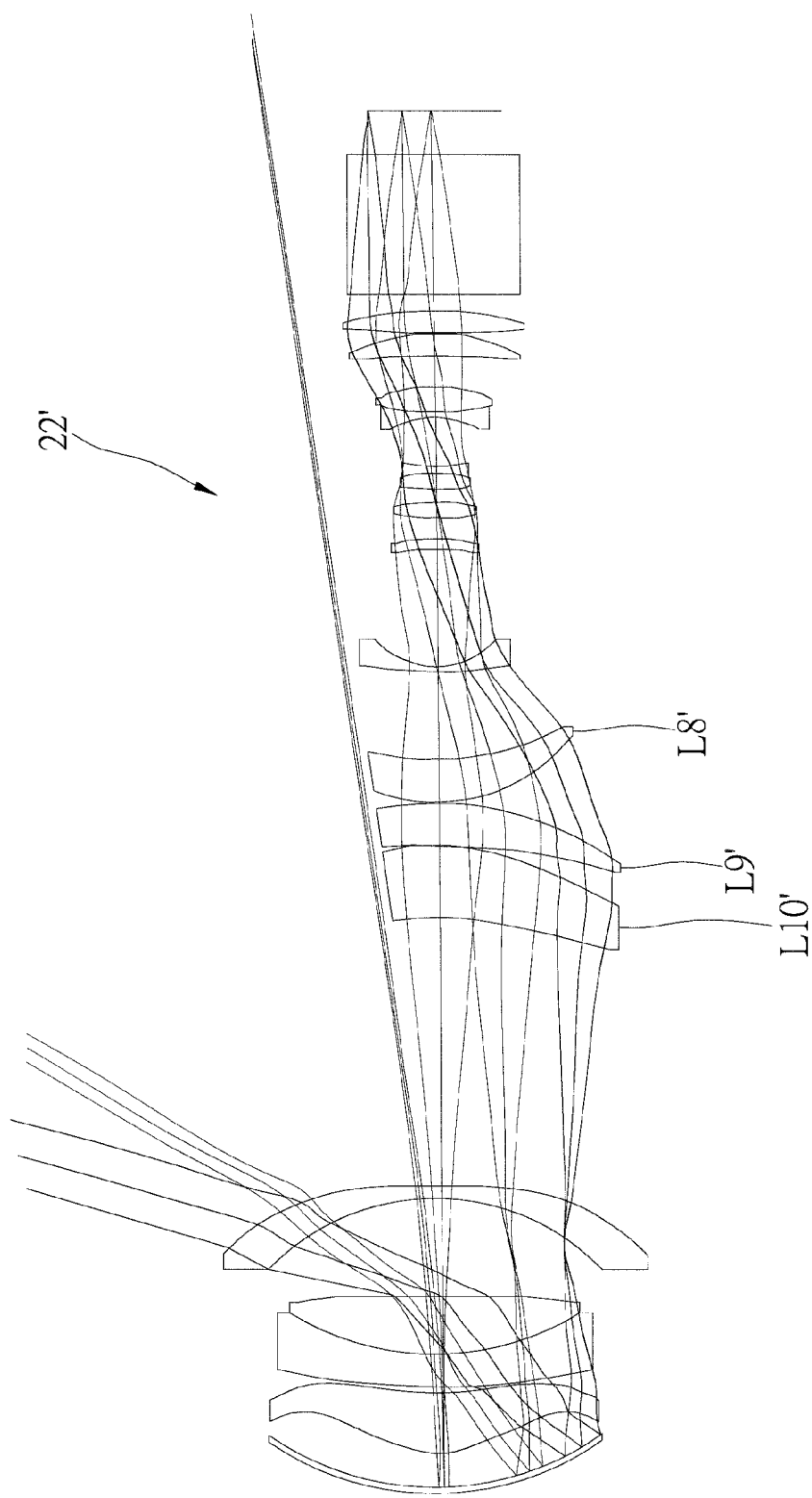
FIG. 4 is a sketch diagram of the arrangement of the lenses of the projecting lens of a second preferred embodiment of the present invention.

FIG. 4 shows a projecting lens of the second preferred embodiment of the present invention, which is similar to the first preferred embodiment, except that some of lenses L8', L9', and L10' are ground or cut at predetermined portions to allow the image rays P from the projection optical system 24 being projected onto the screen directly. Therefore, the projecting lens of the second preferred embodiment would have even higher optical performance, and furthermore, the projecting lens is thinner and lighter.

The description above is a few preferred embodiments of the present invention and the equivalence of the present invention is still in the scope of claim construction of the present invention.

What is claimed is:

1. A projector, comprising:
    an image ray generator generating image rays; and
    a projecting lens receiving the image rays from the image ray generator and projecting the image rays onto a screen, wherein the projecting lens includes a projection optical system and a relay optical system which is closer to the image ray generator than the projection optical system;
    wherein the relay optical system has a plurality of lenses, through which the image rays from the image ray generator pass to the projection optical system;
    wherein the projection optical system includes a lens group and a reflector, and the lens group is between the relay optical system and the reflector; the lens group includes at least one lens, and has a first optical side facing the relay optical system and a second optical side facing the reflector;
    wherein the image rays enter the lens group through the first optical side and leave through the second optical side, and then the image rays is reflected by the reflector to enter the lens group again through the second optical side; the image rays are projected onto the screen after leaving the lens group through the first optical side.

2. The projector as defined in claim 1, wherein the image rays reflected by the reflector pass through at least one of the lenses of the relay optical system after leaving the lens of the projection optical system, and then are projected onto the screen.

3. The projector as defined in claim 1, wherein the image rays before and after being reflected do not cross each other in one of the lenses of the projecting lens which is the last lens for the image rays passing through before leaving the projecting lens.

4. The projector as defined in claim 2, wherein the image rays before and after being reflected do not cross each other in one of the lenses of the projecting lens, which is the last lens for the image rays passing through before leaving the projecting lens.

5. The projector as defined in claim 1, wherein an area of a portion on the first optical side of the lens group where the image rays reflected by the reflector passing through is smaller or equal to a half of an area of the entire first optical side of the lens group.

6. A projecting lens, comprising:
    a relay optical system including a plurality of lenses; and
    a projection optical system including a lens group and a reflector, wherein the lens group is between the relay optical system and the reflector; the lens group includes at least a lens, and has a first optical side facing the relay optical system and a second optical side facing the reflector;
    wherein image rays pass through the relay optical system, enter the lens group through the first optical side, and then leave through the second optical side to be reflected by the reflector to enter the lens group again through the second optical side and then leave through the first optical side.

7. The projecting lens as defined in claim 6, wherein a diameter of the reflector is in a range between 0.5 times and 1.5 times of a diameter of the largest lens of the relay optical system and the projection optical system.

8. The projecting lens as defined in claim 6, wherein the projecting lens satisfies $$-20 \leq CRA \leq 20$$

where CRA is a chief ray angle of the projection optical system.

9. The zoom lens as defined in claim 6, wherein the reflector has a concave surface facing the at least one lens of the projection optical system.

10. The projecting lens as defined in claim 9, wherein the concave surface of the reflector is aspheric.

11. The projecting lens as defined in claim 6, wherein the number of the lenses of the relay optical system is larger than that of the at least one lens of the projection optical system.

12. A method of projecting an image onto a screen, comprising the steps of:
    generating image rays which contain an image;
    making the image rays pass through a relay optical system, wherein the relay optical system has a plurality of lenses;
    making the image rays pass through a lens group, wherein the image rays enter the lens group via a first optical side thereof and leave via a second optical side thereof;
    reflecting the image rays back to the lens group again, wherein the reflected image rays enter the lens group through the second optical side and leave through the first optical side; and
    projecting the image rays onto a screen after the image rays leaving the lens group.

13. The method as defined in claim 12, wherein the image rays pass through at least one of the lenses in the relay optical system after leaving the lens group through the first optical side, and then are projected onto the screen.

14. The method as defined in claim 12, wherein the image rays before and after being reflected do not cross each other in one of the lenses of the relay optical system, which is the last lens for the image rays passing through before being projected onto the screen.

15. The method as defined in claim 13, wherein the image rays before and after being reflected do not cross each other in one of the lenses of the relay optical system, which is the last lens for the image rays passing through before being projected onto the screen.

16. The method as defined in claim 15, wherein an area of a portion on the first optical side of the lens group where the reflected image rays passing through is smaller or equal to a half of an area of the entire first optical side of the lens group.

* * * * *